(12) United States Patent
Chang et al.

(10) Patent No.: US 8,763,964 B2
(45) Date of Patent: Jul. 1, 2014

(54) SUPPORT BRACKET FOR ELECTRONIC DEVICE

(75) Inventors: Chin-Ming Chang, New Taipei (TW); Ching-Jou Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 149 days.

(21) Appl. No.: 13/407,377

(22) Filed: Feb. 28, 2012

(65) Prior Publication Data

US 2013/0105651 A1 May 2, 2013

(30) Foreign Application Priority Data

Oct. 28, 2011 (TW) .............................. 100139244 A

(51) Int. Cl.
*A47F 5/12* (2006.01)

(52) U.S. Cl.
USPC ....... 248/133; 248/371; 248/923; 361/679.04

(58) Field of Classification Search
USPC ................ 248/161, 157, 133, 139, 140, 371, 248/372.1, 923, 922, 921; 361/679.04, 361/679.21, FOR. 104, FOR. 105
See application file for complete search history.

(56) References Cited

U.S. PATENT DOCUMENTS

| | | | | |
|---|---|---|---|---|
| 7,644,897 | B2* | 1/2010 | Shin ........................... | 248/176.1 |
| 2004/0011932 | A1* | 1/2004 | Duff .............................. | 248/157 |
| 2007/0152125 | A1* | 7/2007 | Lee ................................ | 248/398 |
| 2011/0174952 | A1* | 7/2011 | Huang et al. .................. | 248/371 |
| 2011/0260028 | A1* | 10/2011 | Atallah et al. ................ | 248/371 |
| 2013/0026326 | A1* | 1/2013 | Atallah et al. ................ | 248/371 |

* cited by examiner

*Primary Examiner* — Alfred J Wujciak

(74) *Attorney, Agent, or Firm* — Novak Druce Connolly Bove + Quigg LLP

(57) ABSTRACT

A support bracket includes a sliding assembly including a mounting board, two guiding elements, a fixing board, a sliding rod and an elastic member. The guiding elements are oppositely fixed to the mounting board, the sliding rod includes two sliding blocks. An arched guiding groove is defined in the longitudinal length of each guiding element, in which one of the sliding blocks is slidably located. The sliding rod and the guiding elements tilt the mounting board at different angles relative to the fixing board when the sliding rod slides relative to the mounting board along the guiding grooves. The elastic member provides an elastic force opposite to a gravity of the mounting board and the guiding elements to position the mounting board at the different angles.

10 Claims, 5 Drawing Sheets

SUPPORT BRACKET FOR ELECTRONIC DEVICE

BACKGROUND

1. Technical Field

The exemplary disclosure relates to support brackets for supporting electronic devices, especially for monitors.

2. Description of Related Art

Support brackets are used to support portable electronic devices of many different types and configurations, including but not limited to monitors, can be placed on a wall or other supporting surfaces in an appropriate orientation to make it more comfortable for the users to view the display. However, the supporting angles of typical support brackets are not easily adjusted to provide a comfortable viewing for users.

Therefore, there is room for improvement within the art.

BRIEF DESCRIPTION OF THE DRAWINGS

Many aspects of the exemplary support bracket for electronic device can be better understood with reference to the following drawings. These drawings are not necessarily drawn to scale, the emphasis instead being placed upon clearly illustrating the principles of the present support bracket. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
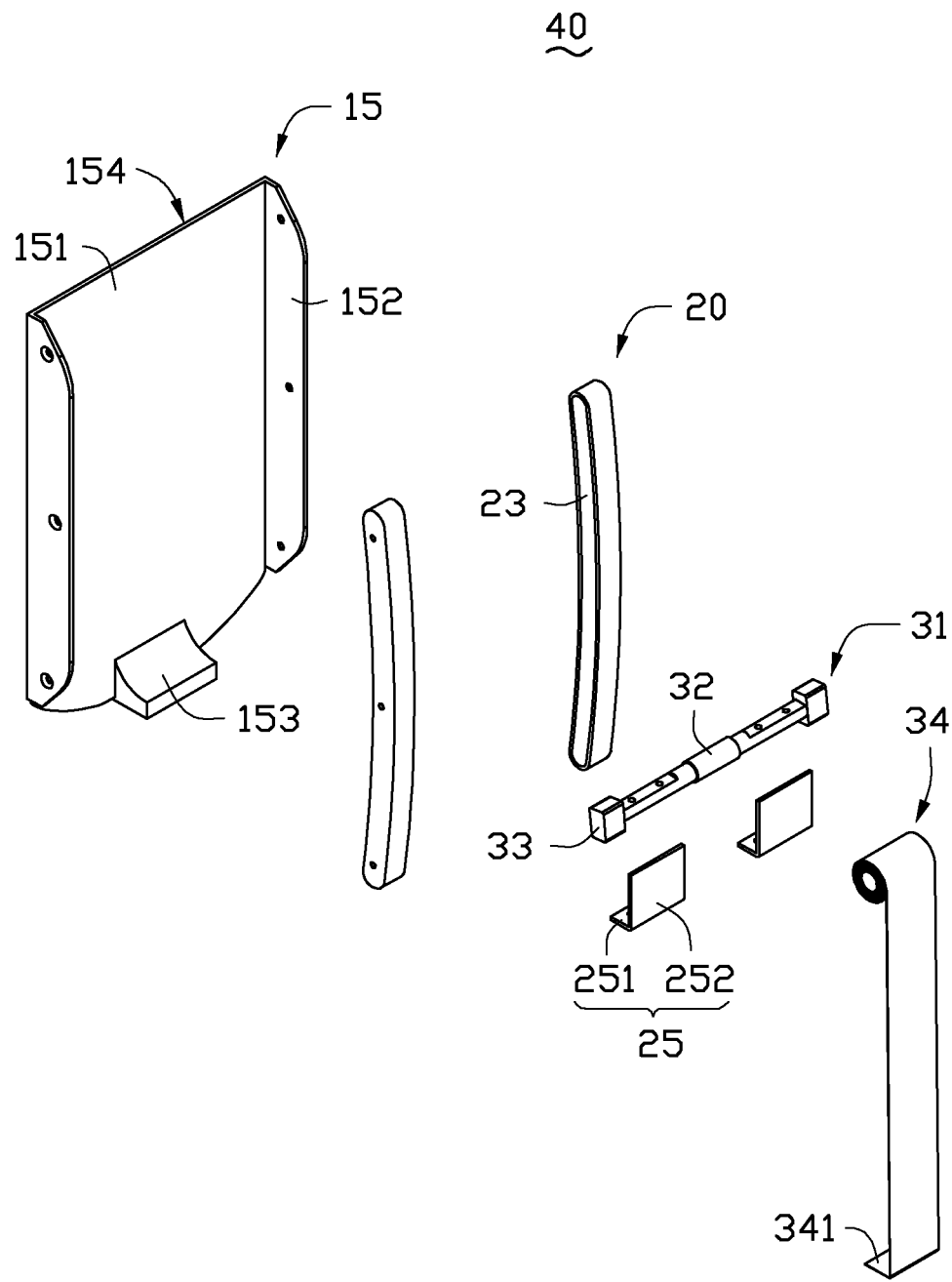
FIG. 1 is a schematic view of a sliding assembly of a support bracket according to an exemplary embodiment.
Figure 2:
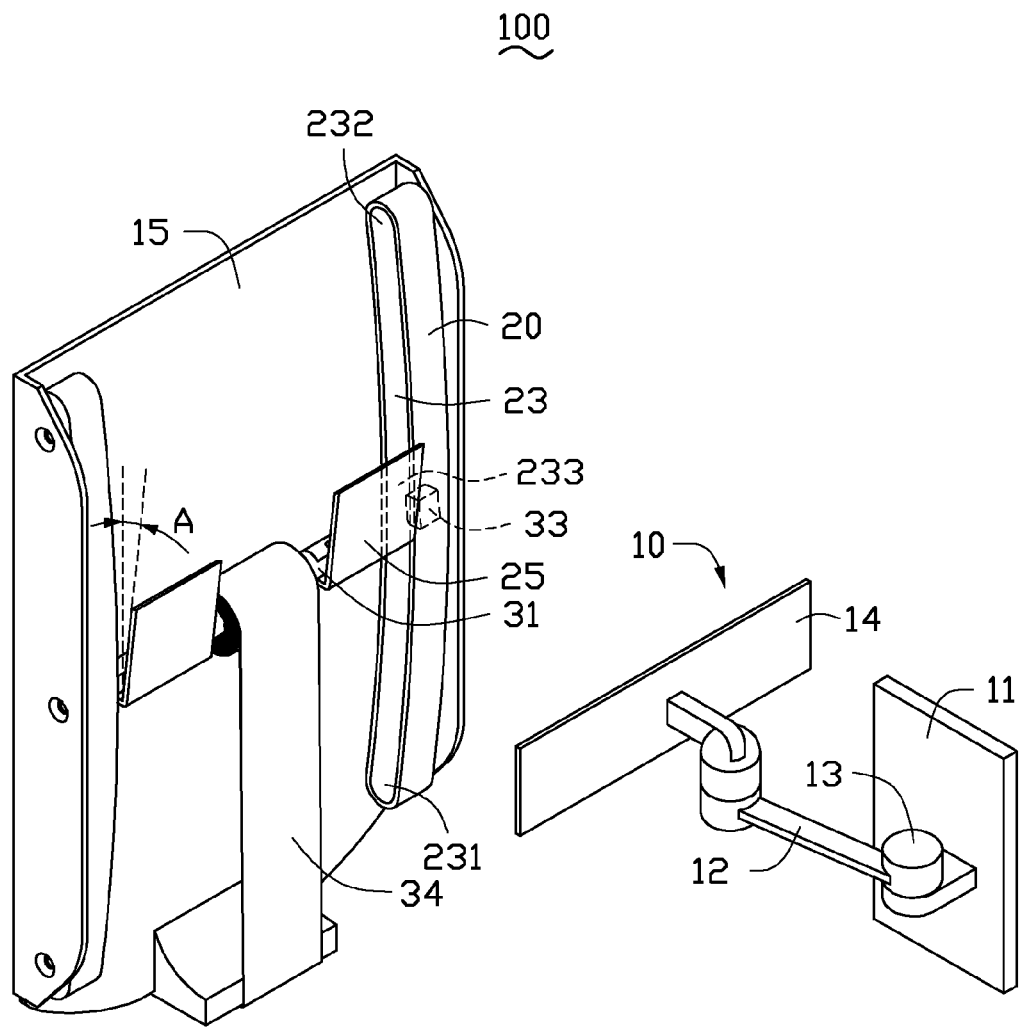
FIG. 2 is a schematic view of an assembled sliding assembly of FIG. 1 and a base.
Figure 3:
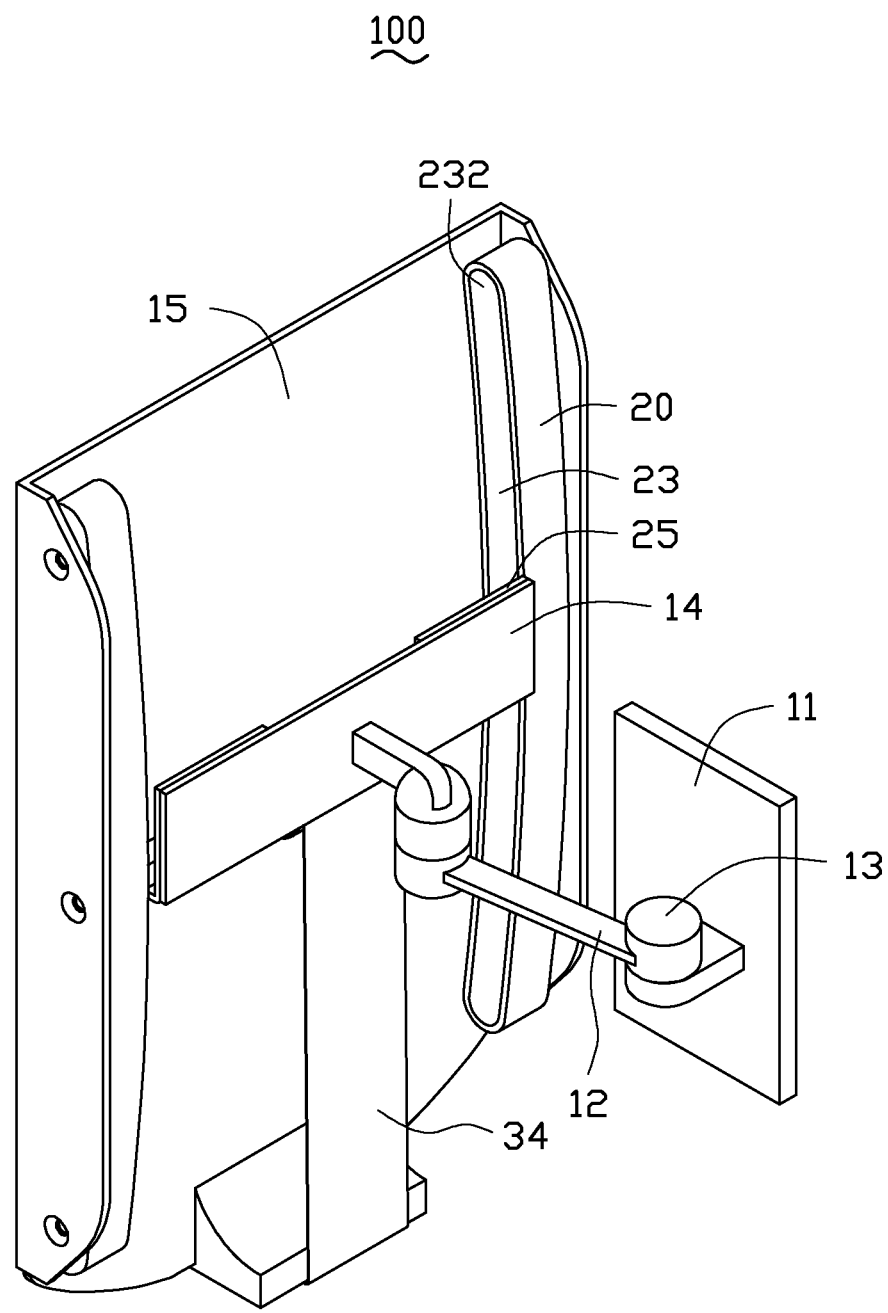
FIG. 3 is a schematic view of assembling the sliding assembly to the base.

An exemplary embodiment of a support bracket 100 is shown in FIGS. 1 to 3. The support bracket 100 includes a base 10 and a sliding assembly 40 fixed to the base 10. The base 10 includes a base board 10, a connecting arm 12 and a connecting board 14. One end of the connecting arm 12 is hinged to the base board 10 by a joint 13, the other end of the connecting arm 12 is fixed to the connecting board 14. Rotating the connecting arm 12 relative to the base board 10 around the joint 13, a distance and an angle between the base board 10 and the connecting board 14 can be adjusted. The connecting board 14 is fixed (e.g., welded) to the sliding assembly 40.

Referring to FIG. 1, The sliding assembly 40 includes a mounting board 15, two guiding elements 20, two fixing boards 25, a sliding rod 31 and a coil spring 34.

The mounting board 15 includes a main body 151, two opposite mounting walls 152 and a retaining block 153. The main body 151 includes a mounting surface 154 for mounting a monitor. The mounting walls 152 protrude from a surface of the main body 151 opposite the mounting surface 154. The retaining block 153 protrudes from the surface of the main body 151, at which the mounting walls 152 are located.

Each guiding element 20 is arched and fixed to one of the mounting walls 152. An arched guiding groove 23 is defined in the longitudinal length of each guiding element 20. Each guiding groove 23 includes a first end 231, a second end 232 and an intermediate point 233 between the first end 231 and the second end 232.

The fixing boards 25 are spacedly fixed to the sliding rod 31, and the connecting board 14 is fixed (e.g., welded) to the fixing boards 25 so the base 10 is fixed to the sliding assembly 40. In this exemplary embodiment, each fixing board 25 is substantially L-shaped, includes a first board 251 and a second board 252 protruding from the first board 251. Each first board 251 is fixed to the sliding rod 31, each second board 252 is fixed to the connecting board 14.

The sliding rod 31 includes two sliding blocks 33, each of which is located at one end of the sliding rod 31. One of the sliding blocks 33 is slidably located in one of the guiding grooves 23, the other sliding block 33 is slidably located in the other guiding groove 23, so the sliding rod 31 is slidably fixed between the guiding element 20 and is capable of sliding relative to the mounting board 15 along the guiding grooves 23. The sliding rod 31 further includes a sleeve 32 fixed between the sliding blocks 33.

One end of the coil spring 34 is fixed to the sleeve 32 on the sliding rod 31, the other end of the coil spring 34 is fixed to the retaining block 153 to exert an elastic force to the mounting board 15 opposite to the gravity of the mounting board 15.

Referring to FIG. 3, a first state of the support bracket 100 is illustrated. The sliding blocks 33 are located at the intermediate points 233. At this time, the sliding rod 31 and the guiding elements 20 tilt the mounting board 15 at a first angle A relative to the fixing board 25, and the coil spring 34 provides an elastic force opposite to the gravity of the mounting board 15 and the guiding elements 20 to position the mounting board 15 at the first angle A.

Figure 4:
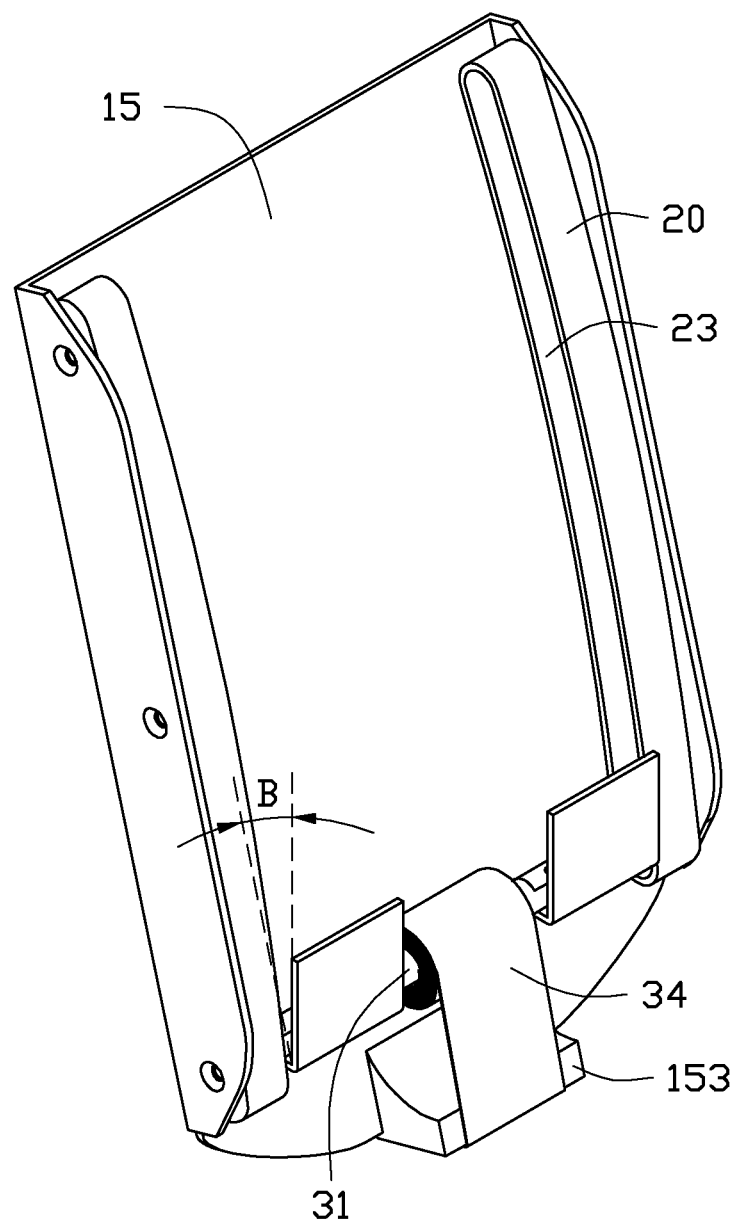
FIG. 4 is a schematic view of the sliding assembly of FIG. 2 in a first state.

Referring to FIGS. 3 and 4, a second state of the support bracket 100 is illustrated. The mounting board 15 slides relative to the fixing board 25 along the guiding grooves 23, until the sliding blocks 33 are located at the first ends 231. At this time, the sliding rod 31 and the guiding elements 20 tilt the mounting board 15 at a second angle B relative to the fixing board 25, the second angle B is different from the first angle A, and the coil spring 34 provides an elastic force opposite to the gravity of the mounting board 15 and the guiding elements 20 to position the mounting board 15 at the second angle B.

Figure 5:
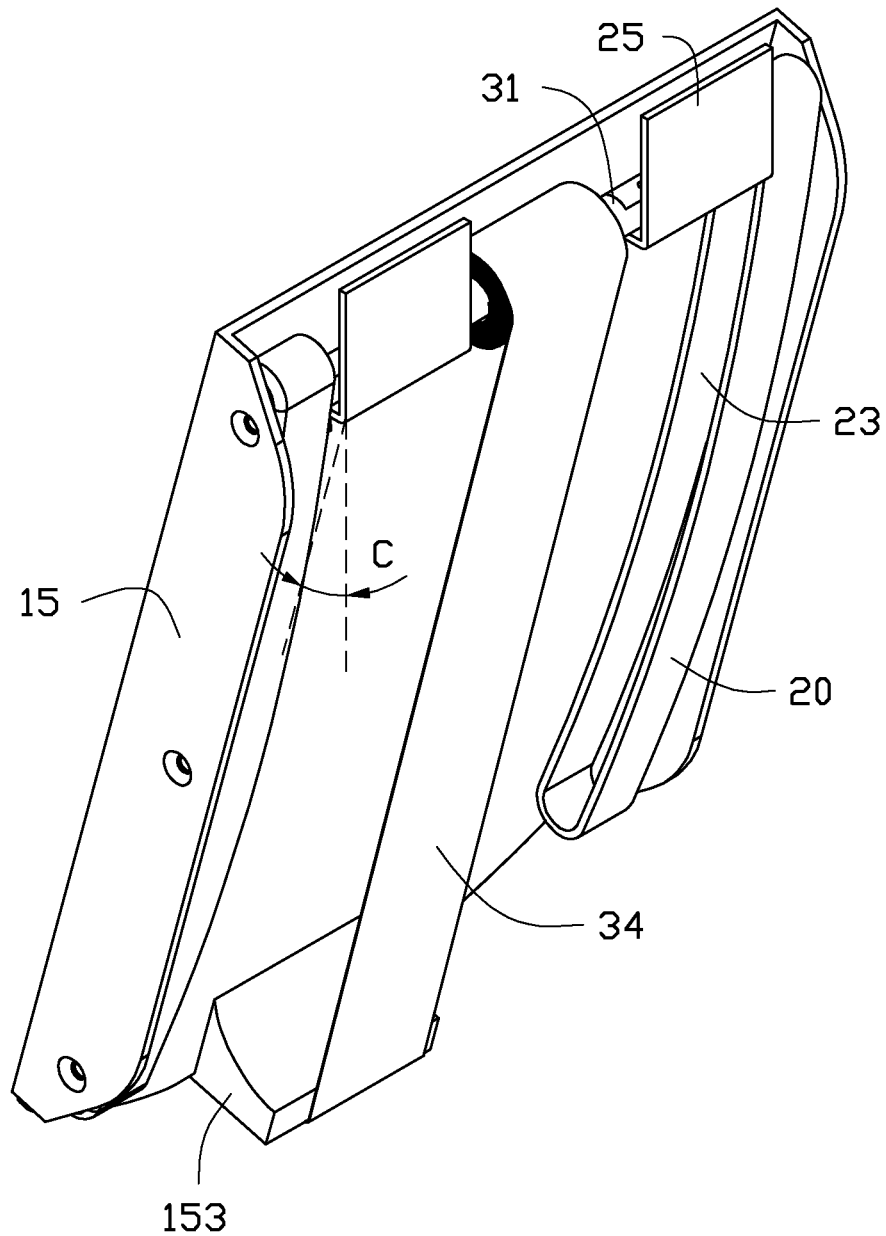
FIG. 5 is a schematic view of the sliding assembly of FIG. 2 in a second state.

Referring to FIGS. 3 and 5, a third state of the support bracket 100 is illustrated. The mounting board 15 slides relative to the fixing board 25 along the guiding grooves 23, until the sliding blocks 33 are located at the second ends 232. At this time, the sliding rod 31 and the guiding elements 20 tilt the mounting board 15 at a third angle C relative to the fixing board 25, the second angle C is different from the first angle A and second angle B, and the coil spring 34 provides an elastic force opposite to the gravity of the mounting board 15 and the guiding elements 20 to position the mounting board 15 at the third angle C.

In the first, second and third states, the support bracket 100 has varying shapes which are helpful to position the monitor to slope in different view angles and in different display orientations to satisfy the varying requirements of the users. Additionally, the monitor can be positioned in any view angle relative to the fixing board 25 between the first state, second state and third state to satisfy the varying requirements of the users.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A support bracket for supporting a portable electronic devices, comprising:
   a base for fixing on a support surface; and
   a sliding assembly including a mounting board, two guiding elements, a sliding rod and an elastic member, wherein the guiding elements are oppositely fixed to the mounting board, the sliding rod includes two sliding blocks; an arched guiding groove is defined in the longitudinal length of each guiding element, in which one of the sliding blocks is slidably located, so the sliding rod is capable of sliding relative to the mounting board along the guiding grooves; one end of the elastic member is fixed to the sliding rod, the other end of the elastic member is fixed to the mounting board to exert an elastic force to the mounting board opposite to a gravity of the mounting board;
   wherein the base includes a base board, a connecting arm and a connecting board, one end of the connecting arm is hinged to the base board, the other end of the connecting arm is fixed to the connecting board; the connecting board is fixed to the sliding assembly.

2. The support bracket of claim 1, wherein the mounting board includes a main body, two opposite mounting walls protruding from a surface of the main body; each guiding element is arched and fixed to one of the mounting walls.

3. The support bracket of claim 2, wherein the mounting board further includes a retaining block protruding from the surface of the main body, at which the mounting walls are located; said the other end of the elastic member is fixed to the retaining block.

4. The support bracket of claim 1, wherein rotating the connecting arm relative to the base board, a distance and an angle between the base board and the connecting board is capable of being adjusted.

5. The support bracket of claim 4, wherein the sliding assembly further includes two fixing boards spacedly fixed to the sliding rod, and the connecting board is fixed to the fixing boards so the base is fixed to the sliding assembly.

6. The support bracket of claim 5, wherein each fixing board includes a first board and a second board protruding from the first board; each first board is fixed to the sliding rod, each second board is fixed to the connecting board.

7. A support bracket supporting a portable electronic devices, comprising:
   a sliding assembly including a mounting board, two guiding elements, a fixing board, a sliding rod and an elastic member, wherein the guiding elements are oppositely fixed to the mounting board, the sliding rod includes two sliding blocks; an arched guiding groove is defined in the longitudinal length of each guiding element, in which one of the sliding blocks is slidably located; the sliding rod and the guiding elements tilt the mounting board at different angles relative to the fixing board, wherein the fixing board is adapted to be connected to a base which is fixed on a support surface when the sliding rod slides relative to the mounting board along the guiding grooves, and the elastic member provides an elastic force opposite to a gravity of the mounting board and the guiding elements to position the mounting board at the different angles;
   wherein the mounting board includes a main body, two opposite mounting walls protruding from a surface of the main body; each guiding element is arched and fixed to one of the mounting walls, the mounting board further includes a retaining block protruding the surface of the main body, at which the mounting walls are located; said the other end of the elastic member is fixed to the retaining block.

8. The support bracket of claim 7, further comprising a base, wherein the base includes a base board, a connecting arm and a connecting board, one end of the connecting arm is hinged to the base board, the other end of the connecting arm is fixed to the connecting board; the connecting board is fixed to the fixing board.

9. The support bracket of claim 8, wherein rotating the connecting arm relative to the base board, a distance and an angle between the base board and the connecting board is capable of being adjusted.

10. The support bracket of claim 9, wherein the fixing board includes a first board and a second board protruding from the first board; the first board is fixed to the sliding rod, the second board is fixed to the connecting board.

* * * * *